United States Patent Office 3,044,933
Patented July 17, 1962

3,044,933
MAGNESIUM HYDROXIDE SUSPENSIONS
Donald E. Cadwallader, Albany, N.Y., assignor to Sterling Drug Inc., New York, N.Y., a corporation of Delaware
No Drawing. Filed June 21, 1960, Ser. No. 37,579
3 Claims. (Cl. 167—55)

This invention relates to aqueous suspensions of magnesium hydroxide.

It is an object of this invention to provide pharmaceutical preparations which can be employed in oral therapy when the use of an antacid or mild laxative is indicated. It is a particular object of the invention to provide compositions which are stable upon standing, smooth and palatable.

The use of magnesium hydroxide as an antacid and mild laxative has been known for many years and, as such, is formulated either as milk of magnesia or as a tablet. In spite of its long use, milk of magnesia is subject to certain disadvantages including the settling out of the suspension upon standing and an unpleasant chalklike taste which is difficult to mask.

In accordance with the present invention, I have now succeeded in preparing aqueous suspensions of magnesium hydroxide which are stable, smooth and palatable. The new compositions consist of aqueous suspensions of magnesium hydroxide stabilized and smoothed by a small percentage of particular non-ionic water-soluble polymers derived from cellulose.

The non-ionic water-soluble polymers useful in practicing the invention are the hydroxyethyl ethers of cellulose described in U.S. Patent 2,572,309, issued October 23, 1951, which are hydroxyethylated cellulose ether polymers prepared by condensing cellulose with 0.1–5.0 parts of ethylene oxide per part of cellulose by weight in the presence of alkali in a medium comprising a secondary or tertiary alcohol having three, four or five carbon atoms. Particularly useful hydroxyethylated cellulose ether polymers for the purposes of the invention are the hydroxyethylated cellulose ether polymers produced by condensing cellulose with sufficient ethylene oxide to produce an hydroxyethylated cellulose ether polymer having 1–2.5 hydroxyethyl groups for every anhydroglucose unit in the cellulose. A preferred compound of this group is the product containing 2.5 hydroxyethyl groups per anhydroglucose unit in the cellulose which is known under the name Natrosol® 250.

In general, it has been found that the preferred hydroxyethylated cellulose ethers correspond to polymers wherein at least one of the three available hydroxy groups in each of the anhydroglucose units making up cellulose is etherified. However, the hydroxyethylated cellulose ethers wherein the degree of substitution is less than one etherified hydroxyl group per anhydroglucose unit are operative but are less effective in the compositions of the invention because of the tendency of the suspension to split upon standing.

The hydroxyethylated cellulose ether polymer is used in relatively small amount in the compositions. Ordinarily. 0.25% to 2.5% by weight of the hydroxyethyl cellulose is sufficient for satisfactory results. For general use, it has been found that 0.5–2.5% by weight of the hydroxyethyl cellulose is preferably, the precise quantity depending on the desired viscosity.

The amount of magnesium hydroxide in the aqueous suspension can be varied considerably but the preferred range lies between about 7–10% by weight. Of course the amount of magnesium hydroxide present should not be so great as to result in an objectionable thickness in the preparation.

The compositions of the invention can also include a sweetening agent, as, for example, saccharin, a flavoring agent, as, for example, peppermint, and preservatives, as, for example, the methyl and propyl p-hydroxybenzoates. Of course, the use of sweetening and flavoring agents is conventional and forms no part of the instant invention and it is contemplated that any such agents can be used.

The compositions of the invention are conveniently prepared by incorporating the polymer into an aqueous suspension of magnesium hydroxide and homogenizing the resultant mixture. The sweetening and flavoring agents along with preservative can be added at any convenient stage. The compositions can then be packaged in the ordinary glass containers.

The following example will illustrate specific embodiments of the invention without, however, limiting it thereto.

*Example*

Composition: Percent by weight
Hydroxyethylated cellulose ether polymer__ 0.75
Saccharin, soluble_____ 0.05
Flavor_____ 0.02
Milk of Magnesia, U.S.P., to_____ 100.00

The milk of magnesia (4 kilograms) was placed in a suitable container and 30 grams of hydroxyethylated cellulose ether polymer (Natrosol) added slowly over about fifteen to thirty minutes and the mixture stirred over two to three hours with vigorous stirring. To the mixture was added 2 g. of saccharin and 0.8 g. of flavor, and the mixture homogenized and the resulting formulation placed in screw-capped bottles.

Other equally satisfactory formulations were prepared using 1%, 1.25% and 2% of hydroxyethylated cellulose ether polymer (Natrosol) with or without flavoring and sweetening.

The compositions of the invention retained both stability and palatability on standing whereas magnesia magma, U.S.P., magnesia magma with natural products such as acacia, agar, gelatin and karaya gum, modified natural products, as for example, ethyl cellulose, methylcellulose, and organic and inorganic alginates were unsatisfactory in either failing to cover up the chalk-like taste of the magnesium hydroxide or giving an unstable and non-uniform suspension.

I claim:

1. An aqueous pharmaceutical suspension comprising magnesium hydroxide and an hydroxyethylated cellulose ether polymer having 1 to 2.5 hydroxyethyl groups for each anhydroglucose unit making up the cellulose.

2. An aqueous pharmaceutical suspension comprising magnesium hydroxide and from 0.25% to 2.5% by weight of an hydroxyethylated cellulose ether polymer having 1 to 2.5 hydroxyethyl groups for each anhydroglucose unit making up the cellulose.

3. An aqueous pharmaceutical suspension comprising magnesium hydroxide and 0.75% by weight of an hydroxyethylated cellulose ether polymer maving 2.5 hydroxyethyl groups for each anhydroglucose unit making up the cellulose.

References Cited in the file of this patent
UNITED STATES PATENTS
2,833,690 Entrekin _____ May 6, 1958

OTHER REFERENCES
Whistler: Industrial Gums, 1959, pages 597, 598, 601, and 603–605, Academic Press, N.Y.

UNITED STATES PATENT OFFICE
CERTIFICATE OF CORRECTION

Patent No. 3,044,933                              July 17, 1962

Donald E. Cadwallader

It is hereby certified that error appears in the above numbered patent requiring correction and that the said Letters Patent should read as corrected below.

Column 1, line 33, for "2,572,309" read -- 2,572,039 --; line 63, for "0.5-2.5%" read -- 0.5-2.0% --; line 64, for "preferably" read -- preferable --; column 2, line 40, for "magnesia magma" read -- Magnesia Magma --; line 60, for "maving" read -- having --.

Signed and sealed this 8th day of January 1963.

(SEAL)
Attest:

ERNEST W. SWIDER
Attesting Officer

DAVID L. LADD
Commissioner of Patents